(12) United States Patent
Yang et al.

(10) Patent No.: US 11,402,010 B2
(45) Date of Patent: Aug. 2, 2022

(54) TRANSMISSION HOUSING UNIT AND TRANSMISSION UNIT HAVING A WEDGE-SHAPED COMPENSATION ELEMENT FOR AXIAL PLAY COMPENSATION

(71) Applicant: NIDEC MOTORS & ACTUATORS (GERMANY) GmbH, Bietigheim-Bissingen (DE)

(72) Inventors: Jian Yang, Ludwigsburg (DE); Max Schwing, Ludwigsburg (DE)

(73) Assignee: NIDEC MOTORS & ACTUATORS (GERMANY) GmbH, Bietigheim-Bissingen (DE)

( * ) Notice: Subject to any disclaimer, the term of this patent is extended or adjusted under 35 U.S.C. 154(b) by 146 days.

(21) Appl. No.: 16/767,871

(22) PCT Filed: Dec. 21, 2018

(86) PCT No.: PCT/EP2018/086571
§ 371 (c)(1),
(2) Date: May 28, 2020

(87) PCT Pub. No.: WO2019/137802
PCT Pub. Date: Jul. 18, 2019

(65) Prior Publication Data
US 2020/0370635 A1 Nov. 26, 2020

(30) Foreign Application Priority Data
Jan. 10, 2018 (DE) .......................... 102018100458.3

(51) Int. Cl.
*F16H 57/021* (2012.01)
*F16H 1/16* (2006.01)
(Continued)

(52) U.S. Cl.
CPC ............. *F16H 57/021* (2013.01); *F16H 1/16* (2013.01); *F16H 57/023* (2013.01);
(Continued)

(58) Field of Classification Search
CPC ........ F16H 57/021; F16H 1/16; F16H 57/023; F16H 2025/209; F16H 2057/0213; F16H 2057/02221; F16H 2057/127
See application file for complete search history.

(56) References Cited

U.S. PATENT DOCUMENTS 3,848,477 A * 11/1974 Giandinoto ............. F16H 55/24
74/425
6,220,984 B1 * 4/2001 Schulz ...................... F16H 1/46
475/340

(Continued)

FOREIGN PATENT DOCUMENTS

DE 2312395 C2 10/1982
DE 4116368 A1 11/1992
(Continued)

OTHER PUBLICATIONS

International Search Report for International Application No. PCT/EP2018/086571 dated Mar. 29, 2019.

*Primary Examiner* — Zakaria Elahmadi
(74) *Attorney, Agent, or Firm* — Young Basile Hanlon & MacFarlane, P.C.

(57) ABSTRACT

The disclosure relates to a transmission housing unit and to a transmission unit which has said transmission housing unit. The transmission housing unit has a housing main body which has a through hole, through which a shaft which penetrates the housing main body in the axial shaft direction can be pushed into the housing main body, a wedge-shaped compensation element for axial play compensation between the shaft and the housing main body which engages around the shaft at least in a U-shaped or arcuate manner, and a (Continued)

pre-stressed spring element which is arranged between the obtuse end of the compensation element and the housing main body. The compensation element can be displaced radially in the direction of the shaft axis along a guide surface of the housing main body between an assembly position and an active position.

12 Claims, 4 Drawing Sheets

(51) Int. Cl.
  *F16H 57/023* (2012.01)
  *F16H 25/20* (2006.01)
  *F16H 57/022* (2012.01)
  *F16H 57/12* (2006.01)
(52) U.S. Cl.
  CPC ............... *F16H 2025/209* (2013.01); *F16H 2057/0213* (2013.01); *F16H 2057/0221* (2013.01); *F16H 2057/127* (2013.01)

(56) References Cited

U.S. PATENT DOCUMENTS

| | | | |
|---|---|---|---|
| 7,034,421 B1* | 4/2006 | Walther | H02K 7/081 310/83 |
| 10,876,623 B2* | 12/2020 | Bruhn | F16H 57/039 |
| 2005/0134131 A1* | 6/2005 | Myerly | H02K 7/081 310/90 |
| 2009/0217779 A1* | 9/2009 | Brosowske | F16H 57/022 74/411 |
| 2014/0298938 A1* | 10/2014 | Arndt | H02K 7/06 74/409 |
| 2018/0154927 A1* | 6/2018 | Wilkes | B62D 5/04 |

FOREIGN PATENT DOCUMENTS

| | | |
|---|---|---|
| DE | 19520886 C1 | 10/1996 |
| DE | 19854535 A1 | 6/2000 |
| DE | 102011000972 A1 | 8/2012 |
| EP | 1546576 B1 | 11/2006 |

* cited by examiner

TRANSMISSION HOUSING UNIT AND TRANSMISSION UNIT HAVING A WEDGE-SHAPED COMPENSATION ELEMENT FOR AXIAL PLAY COMPENSATION

CROSS-REFERENCE TO RELATED APPLICATION(S)

This application is a 371 of International Application No. PCT/EP2018/086571 filed on Dec. 21, 2018, which claims the priority to German Application No. DE 102018100458.3, filed on Jan. 10, 2018, the entire disclosures of which are hereby incorporated by reference.

The invention relates to a gear housing unit and a gear unit having a wedge-shaped compensation element for compensating axial play of a shaft, as used e.g. to adjust moving parts of motor vehicles.

EP 1 546 576 B1 discloses a gear unit with an electric motor which, via a worm gear housed in a gear housing, actuates a shaft which protrudes through the gear housing on both sides. In order to compensate the axial play of the shaft, a wedge-shaped compensation element is provided which encompasses the shaft in a U-shaped or arcuated manner. This compensation element has resilient properties and is pre-stressed in the direction of the shaft axis by the housing cover being screwed on, until the compensation element is clamped, by reason of the wedge shape, between a first stop surface formed on the gear housing and a second stop surface connected to the shaft.

A disadvantage with the above-mentioned solution is that firstly all components of the assembly must be placed in the gear housing and pre-stressing of the compensation element takes place only at the end when then housing cover is placed and screwed on. This makes assembly of the gear unit more complicated. Furthermore, a subsequent quality control procedure to see whether the desired pre-stressing is actually present is not reliably possible. Moreover, in the above-mentioned solution, the position and the size of the housing cover are fixed by its function as a pre-stressing device for the compensation element. The design freedom for the housing cover is correspondingly limited.

The object of the present invention is to provide an assembly-friendly gear housing unit or gear unit which reliably provide for an axial play compensation.

The object is achieved in accordance with the invention by a gear housing unit as claimed in claim 1 and a gear unit as claimed in claim 11.

The gear housing unit has a housing main body which comprises a through-hole through which a shaft that protrudes through the housing main body in an axial shaft direction is insertable into the housing main body, a wedge-shaped compensation element which encompasses the shaft at least in a U-shaped or arcuated manner for compensating axial play between the shaft and the housing main body, and a pre-stressed spring element which is arranged between the blunt end of the compensation element and the housing main body. The compensation element is radially slidable towards the shaft axis along a guide surface of the housing main body between an assembly position, where the compensation element unblocks the through-hole, and a functional position, where the compensation element is clamped by the spring element between the guide surface and a stop element of the shaft. Furthermore, the compensation element is held by a snap-lock connection formed between the compensation element and the housing main body in the assembly position By the formation of the snap-lock connection, the compensation element is held in the assembly position until all components have been placed in the gear housing and possibly the housing cover has been screwed on. The snap-lock connection can then be released which leads to the compensation element being pressed into the functional position by reason of the pre-stressing of the spring element. From this point in time, the compensation element ensures effective compensation for axial play. In contrast, prior to this, the compensation element is reliably held in the assembly position so that easy assembly of the individual components is made possible. For example, the shaft can simply be inserted into the housing main body through the through-hole.

By the arrangement of the spring element between the compensation element and the housing main body, it is—in contrast to the identified prior art—unnecessary to match the position and the dimensions of the housing cover to the compensation element. The assembly steps can also be rendered more flexible since the attachment of a housing cover in order to achieve the desired compensation for axial play is not absolutely necessary. It is much rather the case that the gear housing unit in accordance with the invention forms a functional unit even without the housing cover.

Advantageous developments of the gear housing unit in accordance with the invention are the subject matter of the dependent claims.

In one advantageous embodiment, at least one operation opening can be formed in the housing main body, through which the snap-lock connection is accessible. In other words, the housing main body can comprise an opening (e.g. in the form of a bore) extending from its outer surface into the region where the snap-lock connection is formed.

By introducing a suitable operating tool, it is in this way possible for the snap-lock connection to be released easily and quickly after the gear housing unit has been fitted together and in this way for the compensation element to be brought from the assembly position into the functional position.

In a preferred embodiment, the snap-lock connection can be formed between at least one retaining lug formed at the compensation element and a support formed in the housing main body. Such a design for the snap-lock connection permits, on the one hand, assembly-friendly insertion of the compensation element until the retaining lug snaps into the support and in this way retains the compensation element in the assembly position. On the other hand, the retaining lug can be e.g. mechanically deformed, sheared off or completely removed in order to release the snap-lock connection, whereupon the compensation element is pressed into the functional position by the spring element. In particular, in combination with the above-mentioned operation opening it is possible to shear off or plastically deform the retaining lug in an assembly-friendly manner by means of an operating tool inserted into the operation opening.

In a preferred embodiment, a retaining lug can be formed at at least one leg of the compensation element, which engages with a support formed at the housing main body to form the snap-lock connection, and at least one operation opening can be formed in the housing main body in the area of the support respectively. Both legs of the compensation element are preferably each provided with a retaining lug. The retaining lug lies in each case on a support and is accessible through an operation opening. Therefore, a respective snap-lock connection is formed on both sides between the compensation element and the housing main body. This leads to symmetrical mounting of the compensation element in the assembly position, which in turn increases the positional stability and positioning reliability of the compensation element.

In a preferred embodiment, at least one guide finger can be formed on the blunt side of the compensation element, which, in the assembly position, engages with a guide notch formed within the housing main body. In this way the blunt side of the compensation element is fixed in position. Tilting of the compensation element and impairment of the operation of the snap-lock connection which might accompany same can thereby be avoided. Furthermore, assembly is rendered easier since the guide fingers provide the assembler with assistance during positioning of the compensation element relative to the housing main body.

In a preferred embodiment, the guide notch can extend to the outer surface area of the housing main body. In other words, the guide notch is formed as a depression in the housing main body, which is accessible from outside. In this way, it is possible to determine from outside (e.g. through a visual check) whether the guide fingers are located in the guide notch and the compensation element is correctly positioned. In addition, such a formation for the guide notch permits accessibility to the guide fingers in the case of unsuccessful positioning or other assembly errors.

In a preferred embodiment, on the blunt side of the compensation element, an extension can be formed, on which the spring element is mounted. In particular, the extension can be formed as a pin, against the exterior surface of which lies the spring element. The extension thereby ensures defined positioning of the spring element. Furthermore, assembly is rendered easier since the extension provides the assembler with assistance during positioning of the spring element relative to the compensation element.

In a preferred embodiment, a blind hole can be formed at the housing main body, into which the spring element is received at the end. By receiving the spring element in such a hole, particularly stable positioning of the spring element is possible. For example, tilting of the spring element is prevented. Therefore, the hole leads to the spring pre-stressing being applied to the compensation element in a reliable manner. Furthermore, assembly is rendered even easier since the hole provides the assembler with assistance during positioning of the spring element relative to the housing main body.

In a preferred embodiment, on the pointed side of the compensation element, a connecting bridge can be formed that connects the two legs of the compensation element with one another. This connecting bridge increases the stability and dimensional stability of the compensation element. In particular, the position preservation of the elements of the snap-lock connection which are formed on the compensation element can be improved in this way. This in turn ensures particularly reliable formation of the snap-lock connection in the assembly position. Furthermore, the connecting bridge can also comprise positioning aids in order also to guide the pointed side of the compensation element possibly in a guide notch—similarly to the guide notch formed on the blunt side of the compensation element in the housing main body.

In a preferred embodiment, the gear housing unit can further comprise a housing cover that comprises an opening corresponding to the through-hole of the housing main body and which can be connected with the housing main body by means of fastening elements. Such a cover can be connected with the housing main body in an assembly-friendly manner only after positioning of the compensation element in the assembly position, and then, together with the housing main body, can ensure protection of the components arranged therein against mechanical damage or becoming dirty.

The gear unit in accordance with the invention comprises the above-described gear housing unit, a shaft protruding through the gear housing unit, a worm wheel attached to the shaft within the gear housing and a worm arranged within the gear housing, drivable by an electric motor and meshing with the worm wheel.

If the compensation element of the gear housing unit is in the functional position then reliable axial play compensation for the shaft is possible. If, in contrast, the compensation element is in the assembly position, the shaft can simply be introduced into the gear housing and the remaining gear elements, such as the worm wheel and worm, can be assembled in the relatively problem-free manner.

The invention will be explained in more detail hereinunder by means of exemplified embodiments and with the aid of the accompanying Figures in which.

The structure of an embodiment given by way of example of the gear unit in accordance with the invention and of the gear housing unit in accordance with the invention is described with reference to the drawings.

Figure 1:
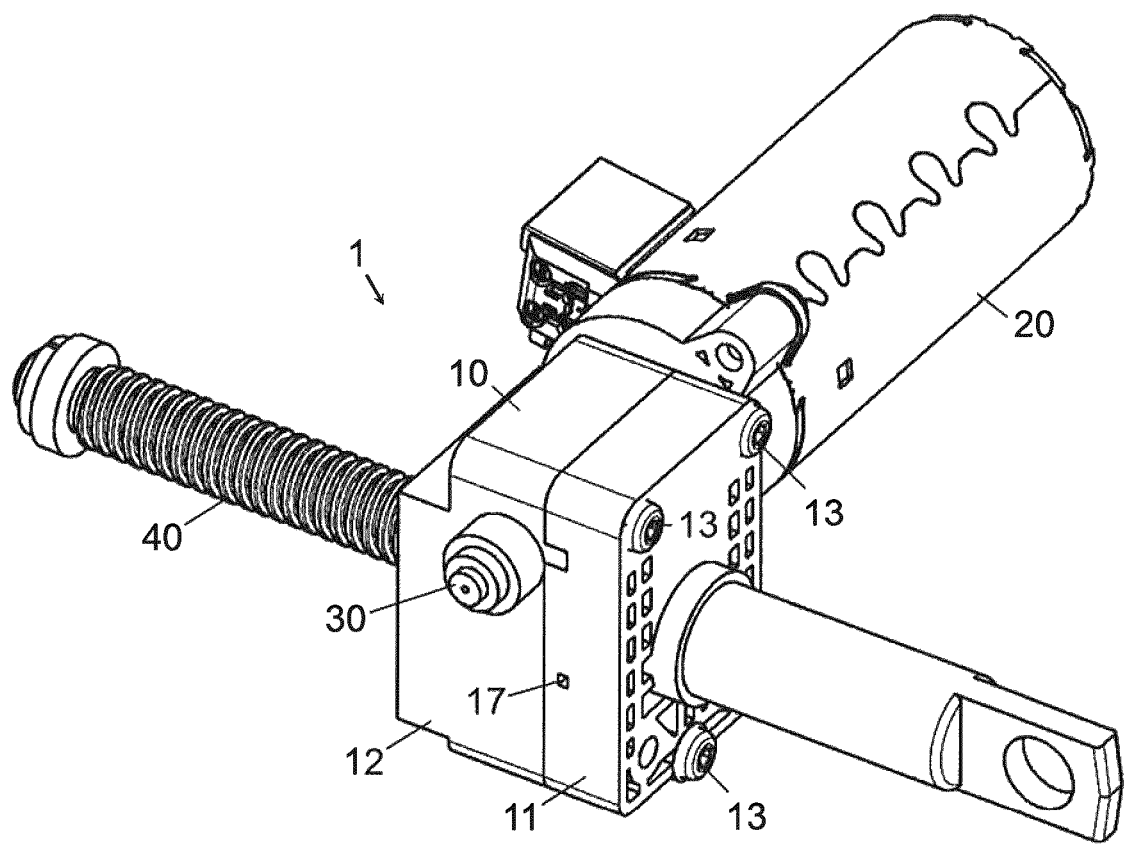
FIG. 1 shows a perspective view of an embodiment of the gear unit with the driving electric motor.
Figure 2:
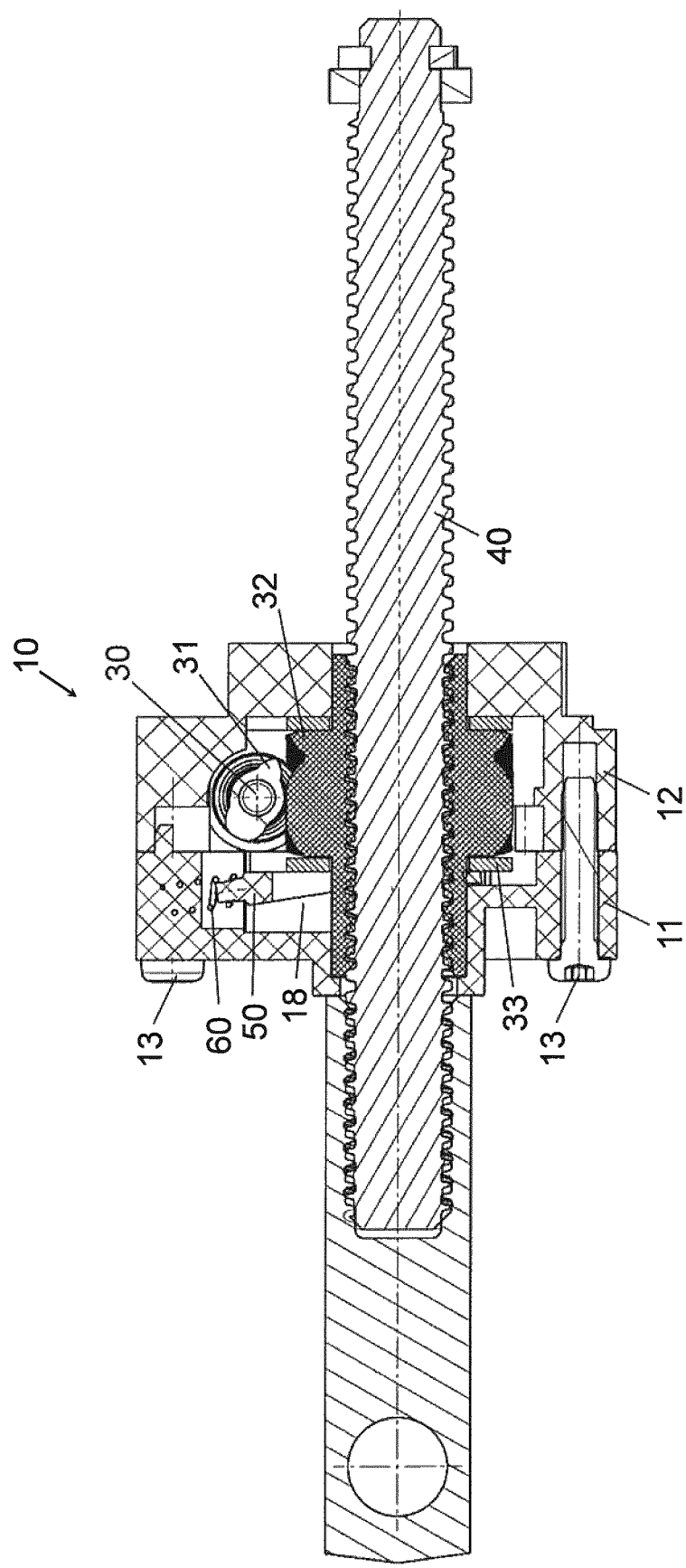
FIG. 2 shows a cross-sectional view of the gear unit of FIG. 1.
Figure 3:
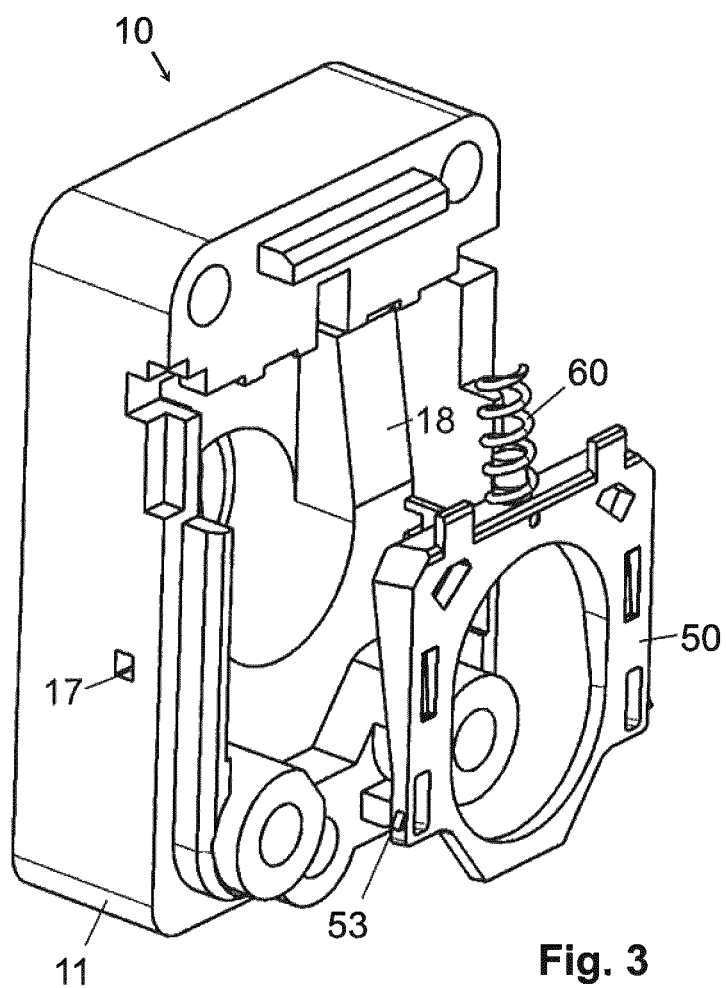
FIG. 3 shows a perspective exploded view of the gear housing unit.
Figure 4:
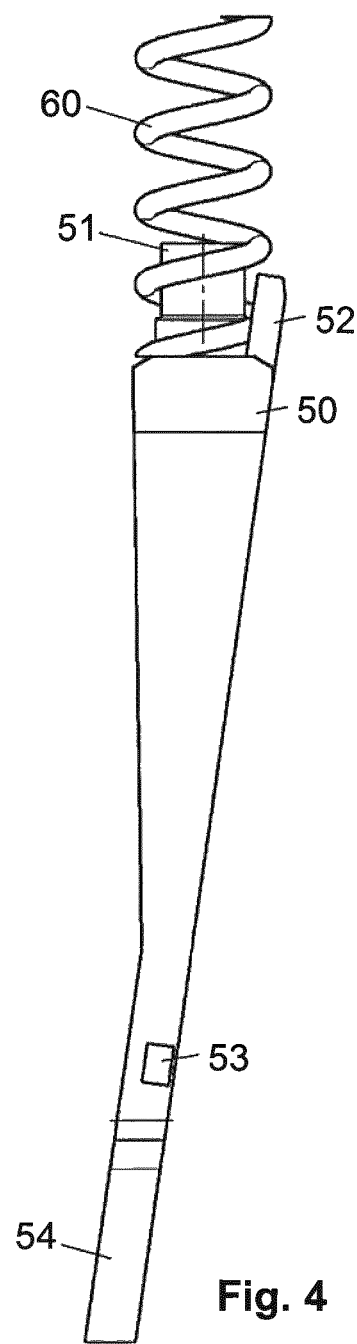
FIG. 4 shows a side view of the wedge-shaped compensation element and of the spring element of FIG. 3.
Figure 5:
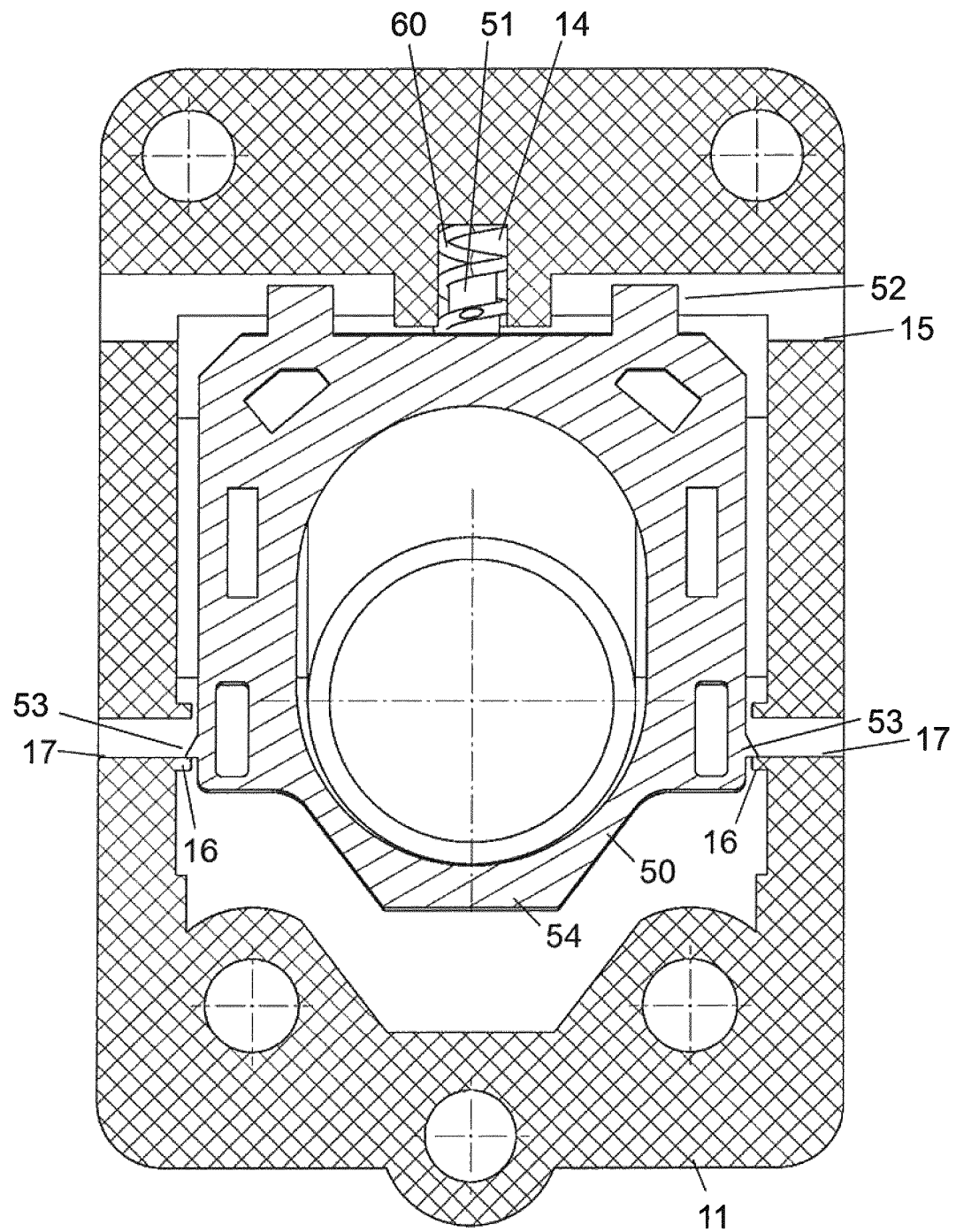
FIG. 5 shows a cross-sectional view of the gear housing unit of FIG. 3.

The gear unit 1 illustrated in FIGS. 1 and 2 essentially consists of a gear housing unit 10, of a drive shaft 30 which can be driven by an electric motor 20, of a worm gear attached within the gear housing unit 10 and of an output shaft 40 of the worm gear protruding through the gear housing unit 10. The gear unit 10 installed in the gear housing 1 is depicted in more detail in FIGS. 3 to 5.

In the present exemplified embodiment, the output shaft 40 is designed as a spindle and can be used in particular to displace movable parts in motor vehicles. Furthermore, the output shaft 40 is a shaft in the sense of the present invention, the axial play of which is compensated by an element described in more detail hereinunder. The axis of the drive shaft 30 is offset by 90° with respect to the axis of the output shaft 40.

The gear housing unit 10 forms, by means of a housing main body 11 and a housing cover 12 on its inside, a receiving space for the worm gear. The housing main body 11 and the housing cover 12 are connected to one another by screws 13. In the present embodiment, the worm gear is formed from a worm 31 which is formed on the drive shaft 30 and meshes with a worm wheel 32. The worm wheel 32 is arranged on the output shaft 40 and transmits the movement of the worm 31 to the output shaft 40 designed as a spindle.

The housing main body 11 has a through-hole matched to the outer diameter of the output shaft 40. In a similar way, the housing cover 12 has an opening corresponding to the through-hole of the housing main body and so the output shaft 40 can be inserted into the gear housing unit 10 and can be mounted therein in such a way that it protrudes on both sides out of the gear housing unit 10.

Within the receiving space formed from the housing main body 11 and the housing cover 12, a wedge-shaped compensation element 50 is also arranged. The compensation element 50 serves for compensating axial play of the output shaft 40, in other words for compensating the play in the axial direction of the output shaft 40 (i.e. in the axial shaft direction), which can be formed between the output shaft 40 and the housing main body 11 e.g. owing to dimensional tolerances, imprecision in assembly or wear. The compensation element 50 encompasses the output shaft 40 U-shaped or arcuated manner A cylindrical extension 51 is formed at the blunt end of the compensation element 50. A spring element 60 is positioned on one end of this extension 51. On the side opposite the extension 51, the spring element is received in a blind hole 14 formed on the housing main body 11. Furthermore, two guide fingers 52 are formed at the blunt end of the compensation element 50. These guide fingers 52 are matched in their dimensions to two guide notches 15 formed in the housing main body 11 and so the compensation element 50 engages with the guide fingers 52 into the guide notches 15 in the assembly position described in more detail hereinunder. The guide notches 15 each extend to the outer surface of the housing main body 11 and so a visual check is possible to ascertain whether the guide fingers 52 are actually located in the respective guide notch 15.

On both legs of the compensation element 50 which encompass the output shaft 40, a retaining lug 53 is formed in each case. In the assembly position described in more detail hereinunder, the two retaining lugs 53 are latched on a respective support 16 formed in the housing main body 11. In each case, a retaining lug 53 and a support 16 therefore form a snap-lock connection. The supports 16 are each formed as a flange or extension of the housing main body 11 adjoining an operation opening 17. The operation opening 17, which in the present exemplified embodiment has a rectangular cross-section, extends through the housing main body 11 and so the retaining lug 53 is accessible from outside. The two legs of the compensation element 50 are connected to each other at the pointed end of the compensation element 50 by a connecting bridge 54.

During assembly of the gear unit 1, the compensation element 50 can now firstly be placed together with the spring element 60 in the housing main body 11 and, by compression of the spring element 60, be inserted into the assembly position. In this assembly position, the retaining lugs 53 latch into the supports 16 and the guide fingers 52 are located in the guide notches 52. The through-hole of the housing main body 11 is exposed owing to the U-shape or arcuate shape of the compensation element 50. Therefore, in a later assembly step, the output shaft 40 can be inserted into the housing main body 11. In other words, the compensation element 50 can be retained in the assembly position by the snap-lock connections formed by the retaining lugs 53 and the supports 16 until all the components have been placed and the housing cover 12 has been screwed on.

At the end of assembly of the gear unit 1, the snap-lock connections can be released. For this purpose, a corresponding operating tool can be introduced into the two operation openings 17 respectively and the respective retaining lug 53 can be e.g. plastically deformed or sheared off. After release of the snap-lock connections, the compensation element 50 is pressed into the functional position by reason of the pre-stressing of the spring element 60. In the functional position, the compensation element 50 is displaced in such a way by the spring element 60 radially in the direction of the shaft axis of the output shaft 40 until it is clamped between a guide surface 18, formed on the housing main body 11, and a run-up plate 33 arranged coaxially to the output shaft 40 and acting as a stop element of the output shaft 40. In the functional position, the compensation element 50 therefore ensures effective axial play compensation for the output shaft 40.

LIST OF REFERENCE SIGNS 1 gear unit
10 gear housing unit
11 housing main body
12 housing cover
13 screw
14 blind hole
15 guide notch
16 support
17 operation opening
18 guide surface
20 electric motor
30 drive shaft
31 worm
32 worm wheel
33 run-up plate
40 output shaft
50 compensation element
51 extension
52 guide finger
53 retaining lug
54 connecting bridge
60 spring element

The invention claimed is:
1. A gear housing unit comprising:
a housing main body, comprising:
  a through-hole; and
  a shaft protruding through the through-hole of the housing main body in a direction of a shaft axis, the shaft insertable into the housing main body;
  a housing cover that comprises an opening corresponding to the through-hole of the housing main body, the shaft protruding through the opening of the housing cover;
a wedge-shaped compensation element encompassing the shaft in at least a U-shaped or arcuated manner for compensating axial play between the shaft and the housing main body; and
a pre-stressed spring element arranged between a blunt end of the wedge-shaped compensation element and the housing main body,
wherein the wedge-shaped compensation element is radially slidable towards the shaft axis along a guide surface of the housing main body between an assembly position, where the wedge-shaped compensation element unblocks the through-hole, and a functional position, where the wedge-shaped compensation element is clamped by the pre-stressed spring element between the guide surface and a stop element of the shaft, and
wherein the wedge-shaped compensation element is held by a snap-lock connection formed between the wedge-shaped compensation element and the housing main body in the assembly position.
2. The gear housing unit according to claim 1, wherein at least one operation opening is formed in the housing main body through which the snap-lock connection is accessible.
3. The gear housing unit according to claim 1, wherein the snap-lock connection is formed between at least one retaining lug, the at least one retaining lug formed at the wedge-shaped compensation element, and a support, the support formed in the housing main body.

4. The gear housing unit according to claim 1, wherein a retaining lug is formed on at least one leg of the wedge-shaped compensation element, which engages with a support formed at the housing main body to form the snap-lock connection, and wherein at least one operation opening is formed in the housing main body in an area of the support.

5. The gear housing unit according to claim 1, wherein at least one guide finger is formed on the blunt end of the wedge-shaped compensation element, and wherein the at least one guide finger, in the assembly position, engages with a guide notch formed within the housing main body.

6. The gear housing unit according to claim 5, wherein the guide notch extends to an outer surface area of the housing main body.

7. The gear housing unit according to claim 1, wherein an extension is formed on the blunt end of the wedge-shaped compensation element, and wherein the pre-stressed spring element is mounted on the extension.

8. The gear housing unit according to claim 1, wherein a blind hole is formed at the housing main body into which an end of the pre-stressed spring element is received.

9. The gear housing unit according to claim 1, wherein, on a pointed end of the wedge-shaped compensation element, a connecting bridge is formed that provides a connection between legs of the wedge-shaped compensation element.

10. The gear housing unit according to claim 1, wherein the housing cover is connected to the housing main body by fastening elements.

11. A gear unit, comprising:
a gear housing unit according to claim 1;
a worm wheel mounted on the shaft within the gear housing unit; and
a worm arranged within the gear housing unit drivable by an electric motor, which meshes with the worm wheel.

12. A gear unit, comprising:
a gear housing unit, comprising:
a housing main body, comprising:
a through-hole; and
a shaft protruding through the through-hole of the housing main body in a direction of a shaft axis, the shaft insertable into the housing main body;
a housing cover that comprises an opening corresponding to the through-hole of the housing main body, the shaft protruding through the opening of the housing cover;
a wedge-shaped compensation element encompassing the shaft so that axial play is compensated between the shaft and the housing main body; and
a pre-stressed spring element arranged between a blunt end of the wedge-shaped compensation element and the housing main body;
a worm wheel mounted on the shaft within the gear housing unit; and
a worm arranged within the gear housing unit drivable by an electric motor, which meshes with the worm wheel,
wherein the wedge-shaped compensation element is radially slidable towards the shaft axis along a guide surface of the housing main body between an assembly position, where the wedge-shaped compensation element unblocks the through-hole, and a functional position, where the wedge-shaped compensation element is clamped by the pre-stressed spring element between the guide surface and a stop element of the shaft, and
wherein the wedge-shaped compensation element is held by a snap-lock connection formed between the wedge-shaped compensation element and the housing main body in the assembly position.

* * * * *